(12) United States Patent
Rantala

(10) Patent No.: US 8,618,442 B2
(45) Date of Patent: Dec. 31, 2013

(54) NOZZLE HOUSING ASSEMBLY

(75) Inventor: Mikko Rantala, Tampere (FI)

(73) Assignee: Glaston Services Ltd. Oy, Tampere (FI)

( * ) Notice: Subject to any disclaimer, the term of this patent is extended or adjusted under 35 U.S.C. 154(b) by 317 days.

(21) Appl. No.: 13/215,692

(22) Filed: Aug. 23, 2011

(65) Prior Publication Data

US 2012/0067861 A1    Mar. 22, 2012

(30) Foreign Application Priority Data

Sep. 22, 2010  (FI) ................................... 20105974

(51) Int. Cl.
*H05B 1/00*    (2006.01)
*C03B 25/00*    (2006.01)

(52) U.S. Cl.
USPC ........... 219/201; 219/388; 219/400; 219/390; 219/405; 432/152; 126/21 A; 34/76; 34/77; 34/78; 392/416; 392/418; 118/724; 118/725; 118/50.1; 65/117; 65/118; 65/199; 65/115; 65/161; 65/162; 65/349; 65/134.6; 65/29.15; 65/29.19

(58) Field of Classification Search
USPC ............. 219/201, 388, 400, 390, 405, 411; 392/416, 418; 118/725, 724, 50.1; 432/152; 34/76–78; 65/117–119, 115, 65/29.15, 29.19, 134.6, 161–2, 349
See application file for complete search history.

(56) References Cited

U.S. PATENT DOCUMENTS

| 5,172,848 | A | 12/1992 | Barten et al. |
|---|---|---|---|
| 5,814,789 | A | 9/1998 | O'Leary et al. |
| 7,127,918 | B2 | 10/2006 | Vitkala et al. |
| 7,448,232 | B2 | 11/2008 | Jarvinen et al. |
| 2004/0083763 | A1 | 5/2004 | Lambert |
| 2006/0207292 | A1 | 9/2006 | Jarvinen et al. |

FOREIGN PATENT DOCUMENTS

FI           114631 B1    11/2004
WO    WO 2004/087593 A1    10/2004

OTHER PUBLICATIONS

Finnish Search Report issued on Mar. 31, 2011, for Finnish Application No. 20105974.

*Primary Examiner* — Shawntina Fuqua
(74) *Attorney, Agent, or Firm* — Buchanan Ingersoll & Rooney PC

(57) ABSTRACT

A nozzle housing assembly, which is used in a convection heating furnace for a heat treatable glass sheet. The nozzle housing assembly comprises an elongated enclosure, at least one elongated heating resistance in the enclosure for heating convection air, and orifices in a bottom surface of the enclosure for blasting heated convection air against the glass sheet. The enclosure is divided with a flow-throttling partition into a top supply duct and a bottom nozzle box, the heating resistances being housed in the latter. Flow-throttling openings present in the partition are positioned to comply with the location and shape of the heating resistances.

8 Claims, 1 Drawing Sheet

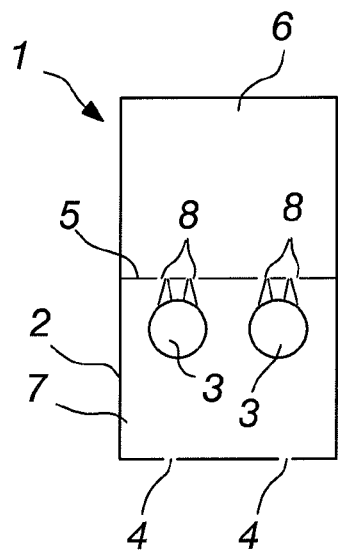
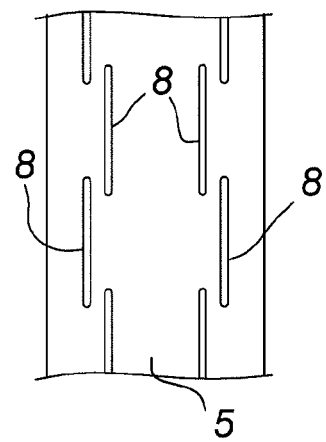
Fig. 1
Fig. 3
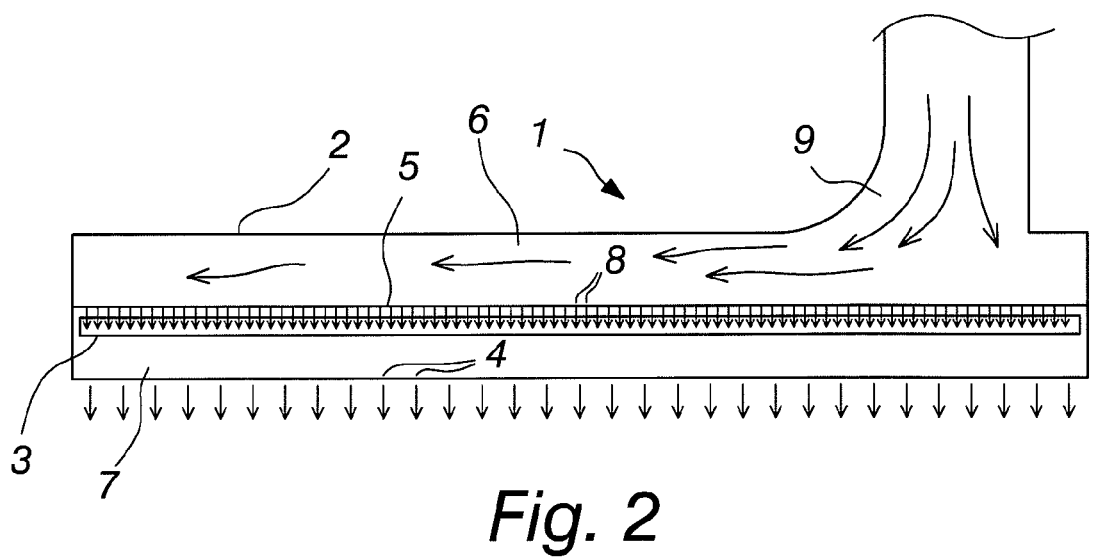
Fig. 2

NOZZLE HOUSING ASSEMBLY

The invention relates to a nozzle housing assembly, which is used in a convection heating furnace for a heat treatable glass sheet and which nozzle housing assembly comprises an elongated enclosure, at least one elongated heating resistance in the enclosure for heating convection air, and orifices in a bottom surface of the enclosure for blasting heated convection air against the glass sheet.

Such nozzle housing assemblies are generally known and employed in glass sheet tempering furnaces, in which a glass sheet to be tempered is carried on rolls beneath the nozzle enclosures. Examples of such nozzle housing assemblies are disclosed in publications U.S. Pat. Nos. 5,814,789 and 7,448,232.

An object of the invention is to provide a nozzle housing assembly, which enables enhancing the transfer of heat from heating resistances to convection air, decreasing the heating resistances' surface temperature, equalizing the convection heating, and, moreover, achieving these objectives with a favorable nozzle housing configuration.

This object is accomplished in the invention on the basis of characterizing features as set forth in the appended claim 1. Preferred embodiments of the invention are presented in the dependent claims.

One exemplary embodiment will now be described in more detail with reference to the accompanying drawing, in which FIG. 1 shows a nozzle housing assembly of the invention in a schematic cross-section;

FIG. 2 shows the same in a longitudinal section.

FIG. 3 shows one exemplary embodiment for a baffle 5 in a plan view.

The illustrated nozzle housing assembly 1 includes an elongated enclosure 2 provided with elongated heating resistances 3 lengthwise of the enclosure. The resistances 3 are used for heating convection air flowing through the enclosure 2. The heated convection air is blasted by way of orifices 4 against a glass sheet (not shown). Several nozzle enclosures 2 are placed side by side at a small distance from each other. Typically, the enclosures 2 have an orientation that matches the conveying direction of glass sheets.

The enclosure 2 is divided with a strongly flow-throttling partition 5 into a top supply duct 6 and a bottom nozzle box 7, the heating resistances 3 being housed in the latter. The partition 5 is provided with flow-throttling openings 8, which are positioned to comply with the location and shape of the heating resistances 3, such that the distribution of air jets discharging from the openings 8 is broader in the area of the resistances 3 than in areas where the air jets are able to bypass the resistances 3. Preferably, the openings 8 are positioned in such a way that the air jets discharging therefrom are mainly directed towards the resistances 3. Hence, the flow channel's narrowest part at the baffle 5 lies above the resistances 3, thus enabling the air jets to be effectively directed towards the resistances. The flow is throttled by the openings 8 of the baffle 5 (causing a pressure loss $\Delta p$). The air jets produced by throttling have a high rate of flow and these air jets impinge on the resistances 3 placed immediately downstream of the openings 8, whereby the heat is effectively transferred into air by the resistances 3. The transfer of heat is enhanced as the speed of air increases on resistance surfaces. As a result, the resistances 3 run colder and last longer. Another result is that the temperature of air is more responsive to regulation of the resistances' performance.

The openings 8 can be provided as aperture rows co-directional with the resistances 3. The apertures can be circular or slot-shaped, i.e. elongated in the direction of the resistances 3. What is essential is that the apertures are not in an excessively sparse pattern or do not have excessively long distances between themselves for the effect of the air jets in terms of cooling the resistances 3 not to become too inconsistent. This is important, especially since there is a short distance from the resistances 3 to the openings 8 with the air jets contacting the resistances at a high rate of speed. The distance of the baffle 5 from the resistances is preferably less than 50 mm, most preferably less than 25 mm. There is a short distance from the resistances 3 to the orifices 4 with the result that temperature differences lengthwise of the enclosure 2 created at the resistances 3 do not have time to substantially equalize over this distance. When the openings are in a dense pattern or slot type in shape, a more consistent temperature is obtained in air jets discharging from the nozzle box 7 through the nozzles 4, whereby convection becomes smoother for a further equalization of the glass temperature. What is achieved at the same time is a more consistent resistance temperature, thus improving the resistances in terms of durability. The openings 8 are positioned in the baffle 5 in such a pattern that the baffle does not include one single apertureless section of over 150 mm in a longitudinal direction of the enclosure 2.

In the described exemplary embodiment, above each resistance 3 are provided two side-by-side rows of openings 8 with air jets therefrom impinging on top and/or side surfaces of each resistance 3. The openings 8 make up not more than 20%, preferably less than 10% of the entire area of the baffle 5, yet not less than 2%. Throttling must not be too severe because, in order to sustain the force of jets discharging towards the glass, it is not advisable to sacrifice too much of the total pressure for this purpose. The pressure loss $\Delta p$ caused by the baffle 5 is preferably less than 20% of the total pressure, typically within the range of 15-5%, yet more than 2% of the total pressure.

When applying the invention, all of the openings 8 need not necessarily blow directly to the resistances 3, but a proportionally small number of openings can also be arranged to blow past the resistances 3 without losing beneficial effects provided by the invention.

In connection with the enclosure 2 is a convection air inlet opening 9 present near an inlet end of the supply duct 2. This solution, which is favorable in terms of construction engineering, is possible because the baffle 5 controls a flow between the ends of the enclosure 2 in such a way that the flow lengthwise of the enclosure 2 occurs mainly just in the supply duct 6. In addition, the flow to be heated, which impinges on the resistances 3 and is established by the baffle 5, has a mass flow rate which is approximately uniform, and the flow to be heated, which impinges on the resistances 3, is at an approximately uniform temperature across the entire resistance length. Hence, the resistances 3 become loaded in a consistent manner and the flow discharging from the orifices 4 towards the glass has a substantially uniform temperature from inlet end to outlet end of the enclosure 2. Thus, convection heating becomes more consistent.

Without the baffle 5, a flow would occur lengthwise of the enclosure (co-directional with the resistance) across the entire length of the nozzle enclosure 2, and the flow to be heated at the resistances 3 would have its mass flow rate decreasing on the way from inlet end to outlet end of the enclosure 2 (because of a flow discharging out of the orifices 4). In this case, the end of the resistances 3 adjacent to the inlet opening 9 would be burdened distinctively less than the outlet end, and the flow discharging from the outlet end orifices 4 towards the glass would be distinctively hotter than the flow discharging towards the glass from the inlet end orifices 4. In this case, the temperature of the jets 4 could be made more equal by adding inlet openings 9 for example at the outlet end and in the middle. Increasing the number of inlet openings 9 makes the assembly more expensive in terms of construction engineering. In addition, it makes a flow channel system between the enclosure 2 and the fan more expensive from the standpoint of construction engineering and more space (height) demanding. The height of an entire convection heating furnace is dependent on the height demanded by flow channel systems.

Since the invention enables enhancing the transfer of heat from resistances to convection air, it is at the same time possible to speed up the adjustment of convection heating during a heating cycle. The enhancement of heat transfer to convection air intensifies convection, whereby a smaller portion of thermal energy evolved by the resistances 3 transfers to glass by radiation.

Contrary to the foregoing exemplary embodiment, the enclosure 2 may only include a single resistance 3 and above and in line with the resistance just a single aperture row 8.

The invention claimed is:

1. A nozzle housing assembly, which is used in a convection heating furnace for a heat treatable glass sheet and which nozzle housing assembly comprises an elongated enclosure, at least one elongated heating resistance in the enclosure for heating convection air, and orifices in a bottom surface of the enclosure for blasting heated convection air against the glass sheet, wherein the enclosure is divided with a flow-throttling partition into a top supply duct and a bottom nozzle box, the heating resistances (3) being housed in the latter, and in that flow-throttling openings present in the partition) are positioned to comply with the location and shape of the heating resistances.

2. A nozzle housing assembly according to claim 1, wherein the openings make up not more than 20%, preferably less than 10% of the surface area of the baffle.

3. A nozzle housing assembly according to claim 1, wherein the openings are positioned in the baffle in such a pattern that the baffle does not include one single apertureless section of more than 150 mm in a longitudinal direction of the enclosure.

4. A nozzle housing assembly according to claim 1, wherein the openings are positioned with respect to the resistances in such a way that the air jets discharging from the openings are mainly directed to the resistances.

5. A nozzle housing assembly according to claim 1, wherein the openings are rows of apertures co-directional with the resistance.

6. A nozzle housing assembly according to claim 5, wherein the openings are slot-shaped and elongated in a longitudinal direction of the resistances.

7. A nozzle housing assembly according to claim 1, wherein above each resistance is present one or more rows of openings, from which air jets impinge on top and/or side surfaces of each resistance.

8. A nozzle housing assembly according to claim 1, wherein the distance of the baffle from the resistances is less than 50 mm, preferably less than 25 mm.

\* \* \* \* \*